United States Patent Office 3,226,946
Patented Jan. 4, 1966

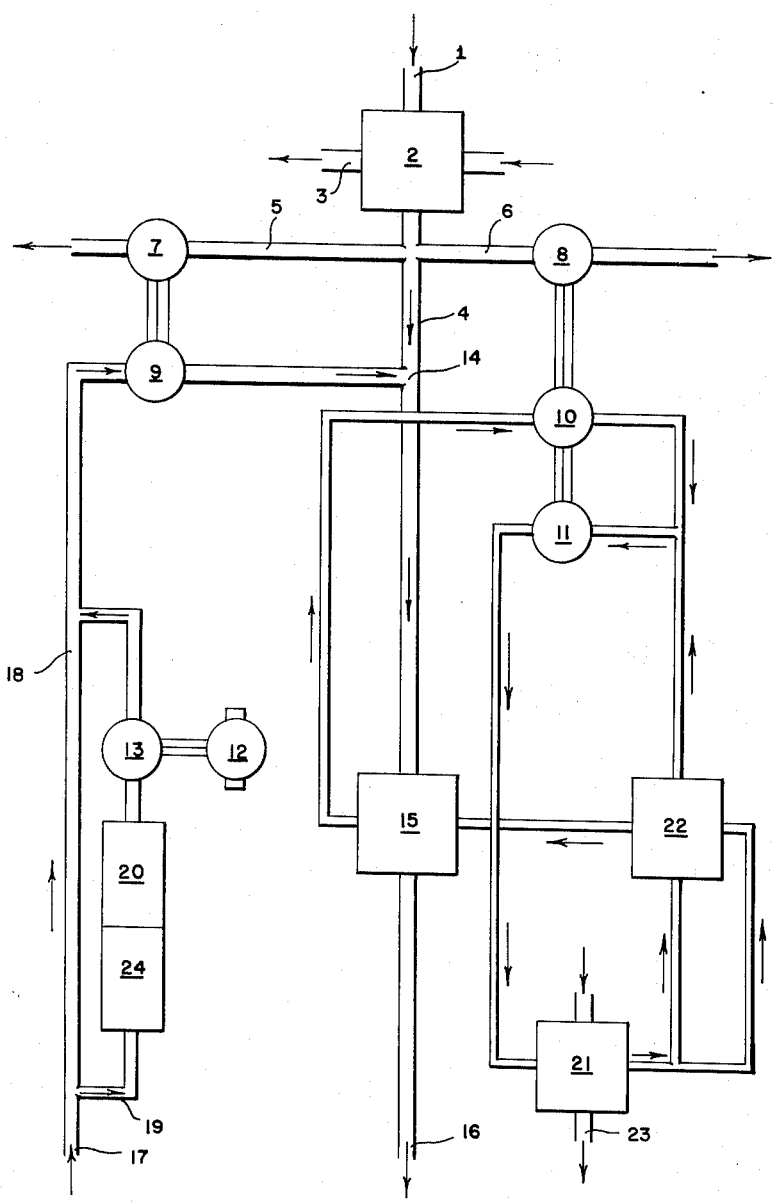

3,226,946
AIR CONDITIONING SYSTEMS FOR AIRCRAFT
Brian H. Rogers, Yeovil, England, assignor to
Normalair Limited, Yeovil, England
Filed Jan. 14, 1964, Ser. No. 337,612
Claims priority, application Great Britain, Jan. 24, 1963,
3,021/63
1 Claim. (Cl. 62—271)

This invention relates to an air conditioning system for use particularly, although not exclusively, in aircraft of the passenger carrying type, and more particularly, although not exclusively, to aircraft of the type that operate at high altitudes and at speeds considerably in excess of the speed of sound.

In a passenger aircraft containing, say, 150 passengers, a considerable quantity of $CO_2$ and of body odours will be produced during a flight. It is, therefore, necessary to remove the $CO_2$ and the odours continuously to reduce their concentration to an acceptable level. This is done normally by flushing the fuselage continuously with a flow of fresh air taken from the outside of at least 1 lb./min./person, even when there is a considerable degree of internal recirculaiton of the air. The provision of this flow of fresh air taken from the outside involves a considerable loss of power and the penalty of high weight of equipment and aerodynamic drag, and it is with this problem in mind that this invention seeks to provide a system whereby the fresh air flow into the cabin is reduced by an amount greater than has hitherto been achieved. By "air" we mean breathable atmosphere, although it may differ slightly in gaseous proportions, from the ambient air.

The amount of fresh air supplied to the cabin from the outside by this invention is equal to or slightly greater than the amount which is required to provide the passengers with oxygen, but is considerably less than that amount which is required to flush out the $CO_2$ and the body odours which are removed by chemical means hereinafter to be described.

By reducing the intake of fresh air, the invention also seeks to reduce the problems associated with known means for supplying occupants with pressurised air from an ambient source. Among such problems are aerodynamic drag, the weight of the necessary equipment, and power losses.

According to the invention there is provided an air conditioning system for an enclosure of an aircraft, comprising means for supplying ambient air to the enclosure, means for cooling the ambient air before it enters the enclosure, means for recirculating the air within the enclosure and means for deodorising the air in the enclosure, whereby sufficient ambient air is supplied to remove excessive carbon dioxide from the enclosure, and to supply the enclosure with sufficient fresh air for occupants therein.

A preferred embodiment of the invention will now be described by way of example with reference to the accompanying drawing, the single figure of which is a diagram of an air conditioning system in accordance with the invention.

Referring to the drawing, an air conditioning system for an enclosure of an aircraft includes a source of fresh air 1 conveniently bled from one or more compressors of the aircraft engines. This air passes through a heat exchanger 2, where it is cooled by air or fuel as generally indicated at 3. The cooled air is then split into three streams 4, 5 and 6, one stream 4 of which is connected to a recirculatory system for the aircraft enclosure at 14, while the other two streams 5 and 6 are led off to drive turbines 7 and 8 respectively.

Turbine 7 drives a gas recirculating fan 9 and the turbine 8 drives a pair of compressors 10 and 11 in a refrigeration or cooling system. A further turbine 12 is also driven by bleed air by means of a suitable connection (not shown) and this turbine 12 drives a fan 13 for a purpose to be described.

The bleed airstream 4, having been joined by the recirculating system at 14 mixes with the recirculating air and passes through a recirculating gas heat exchanger 15 cooled by the abovementioned cooling system. The air stream 16, from the heat exchanger 15, then enters the aircraft enclosure.

Air is withdrawn from the enclosure in a stream 17, and is split into two streams 18 and 19. The stream 18 passes directly (and through such valve control as may be appropriate) to the recirculating fan 9 and back to the enclosure by way of the heat exchanger 15. The other stream 19 is sucked through a carbon dioxide extractor 24 and a deodoriser 20 by the circulating fan 13 before returning to the enclosure by way of the fan 9 and heat exchanger 15. The carbon dioxide extractor may be of any desired type and could, for example, use lithium hydroxide to absorb the carbon dioxide. The extractor will reduce the amount of flushing air necessary. The deodoriser may be of any desired type, such as a chemical extraction unit using deactivated charcoal.

It will be noted that only a part of the recirculated air passes through the deodoriser 20, and this assists in reducing power losses, as it has been found that the passage of all the air through the deodoriser is not necessary to keep the odour level in the recirculated gas acceptable.

The cooling system for the recirculated air is of known form, and comprises the aforementioned heat exchanger 15 and compressors 10 and 11, and a condenser 21 and subcooler 22. The system shown works on a closed circuit vapour cycle refrigeration system of the compression, condensation and evaporation type. Condensing of the refrigerant is carried out in the condenser 21 by means of a heat exchanging arrangement with air or fuel feed as indicated at 23.

Various modifications may be made to the above described air conditioning system without departing from the scope of the invention. For example, the turbines 7, 8 and 12 may be replaced by electric motors, either collectively or individually. Alternatively, the turbines could be driven by ram air derived outside the aircraft.

The cooling system shown may be replaced by other cooling systems such as any suitable air cycle system. Such a system could incorporate a "boot strap" arrangement whereby the supply from the engine compressor passes through a primary cooler, and is compressed by the compressor in the cold air turbine unit, and then passes to the turbine. The air entering the turbine converts heat energy into work by making the turbine drive the compressor which causes a reduction in air temperature through the turbine. Heat gains caused by the action of the compressor are cancelled out by passing through a heat exchanger before entering the turbine.

If desired the carbon dioxide extractor 24 may be omitted. Dehumidifying means may also be provided at an appropriate point in the recirculation system, e.g., in series with or incorporated with the deodoriser 20, or with a carbon dioxide unit if such be present.

It will be apparent to those skilled in the art that this invention has numerous advantages over the systems hitherto proposed, when it is considered that in the past it has been necessary to supply about 1 lb. of fresh air per person per minute for a passenger aircraft, and by applying this invention, and introducing means for absorbing obnoxious odours, the quantity of air required is reduced to approximately one fifth of a pound per minute, for each passenger.

I claim as my invention:

An air conditioning system for an enclosure of an aircraft comprising a first conduit means for conducting ambient air to the enclosure, heat exchange means communicating with said first conduit to provide cooling of the air pasing therethrough, said heat exchange means comprising a closed circuit vapor cycle refrigeration system, a second conduit extending between the enclosure and said first conduit for recirculating air from the enclosure, said second conduit connecting with said first conduit upstream of said heat exchange means in said first conduit, a third conduit leading from and returning to said second conduit for temporarily branching-off a portion of the air passing through said second conduit, extraction means in the third conduit for removing odors and carbon dioxide from the air passing through said third conduit, a first circulating fan in said second conduit for urging recirculation air therethrough, and a second circulating fan in said third conduit for urging a portion of the recirculation air through said third conduit.

References Cited by the Examiner

UNITED STATES PATENTS

| | | | |
|---|---|---|---|
| 2,104,589 | 1/1938 | Hartman | 62—261 |
| 2,217,204 | 10/1940 | Jalma | 62—78 |
| 2,477,931 | 8/1949 | King | 62—402 |
| 2,485,522 | 10/1949 | Andersen | 62—402 |
| 2,485,590 | 10/1949 | Green | 62—402 |
| 2,491,461 | 12/1949 | Wood | 62—172 |
| 2,835,340 | 5/1958 | McGuff | 62—93 |
| 3,049,896 | 8/1962 | Webb | 62—271 |
| 3,097,504 | 7/1963 | Quick | 62—402 |

WILLIAM J. WYE, *Primary Examiner.*

ROBERT A. O'LEARY, *Examiner.*